United States Patent
Maede et al.

(10) Patent No.: US 9,755,509 B2
(45) Date of Patent: Sep. 5, 2017

(54) CONTROL CIRCUIT FOR SWITCHING POWER SUPPLY

(71) Applicant: ROHM CO., LTD., Ukyo-Ku, Kyoto (JP)

(72) Inventors: Jun Maede, Kyoto (JP); Isao Yamamoto, Kyoto (JP); Shinya Karasawa, Kyoto (JP); Shigenobu Shimohagi, Kyoto (JP); Yuichi Shinozaki, Kyoto (JP)

(73) Assignee: ROHM CO., LTD., Ukyo-Ku, Kyoto (JP)

(*) Notice: Subject to any disclaimer, the term of this patent is extended or adjusted under 35 U.S.C. 154(b) by 134 days.

(21) Appl. No.: 14/694,294

(22) Filed: Apr. 23, 2015

(65) Prior Publication Data

US 2015/0311787 A1    Oct. 29, 2015

(30) Foreign Application Priority Data

Apr. 25, 2014 (JP) ................... 2014-091615

(51) Int. Cl.
*G05F 1/00* (2006.01)
*H02M 3/156* (2006.01)

(52) U.S. Cl.
CPC .................. *H02M 3/156* (2013.01)

(58) Field of Classification Search
CPC ...................................... H02M 3/156
USPC ........................................ 323/282
See application file for complete search history.

(56) References Cited

U.S. PATENT DOCUMENTS

| | | | | |
|---|---|---|---|---|
| 2009/0072982 A1* | 3/2009 | Cheng | .................. | G01R 31/028 340/635 |
| 2010/0164456 A1* | 7/2010 | Oyama | ................. | H02M 3/156 323/283 |
| 2011/0285526 A1* | 11/2011 | Tanaka | ............... | H05B 33/0884 340/514 |
| 2013/0170621 A1* | 7/2013 | Saka | ................. | H02M 3/33523 378/104 |
| 2014/0042999 A1* | 2/2014 | Barth | ........................ | H03F 3/00 323/271 |
| 2014/0312873 A1* | 10/2014 | Raja | .......................... | G05F 3/02 323/311 |

(Continued)

FOREIGN PATENT DOCUMENTS

| | | | |
|---|---|---|---|
| CN | 104297577 A | * | 1/2015 |
| JP | 2007252021 A | * | 9/2007 |
| JP | 2010193627 A | | 9/2010 |

OTHER PUBLICATIONS

JP2007252021—Description Translation.*

*Primary Examiner* — Alex Torres-Rivera
(74) *Attorney, Agent, or Firm* — Cantor Colburn LLP (57) ABSTRACT

A power supply circuit is configured including a control circuit together with an output circuit including an external circuit component. A switching controller controls a switching transistor and a synchronous rectification transistor each configured as a switching element. A degradation detection circuit monitors a detection signal having a correlation with characteristic degradation of the circuit component, and detects the degree of characteristic degradation of the circuit component. The switching controller is capable of changing its operation according to the degree of characteristic degradation of the circuit component.

15 Claims, 5 Drawing Sheets

(56) References Cited

U.S. PATENT DOCUMENTS

2015/0205314 A1* 7/2015 Hayashi .................... G05F 1/56
323/217

* cited by examiner

CONTROL CIRCUIT FOR SWITCHING POWER SUPPLY

CROSS REFERENCE TO RELATED APPLICATIONS

The present invention claims priority under 35 U.S.C. §119 to Japanese Application No. 2014-091615 filed Apr. 25, 2014, the entire content of which is incorporated herein by reference.

BACKGROUND OF THE INVENTION

1. Field of the Invention

The present invention relates to a switching power supply.

2. Description of the Related Art

In order to generate a voltage that is lower than the supplied input voltage, a power supply circuit such as a DC/DC converter (switching regulator) or the like is employed. Examples of such a known power supply circuit include power supplies using an analog control method and power supplies using a digital control method. With an analog control method, an error amplifier amplifies the difference between the output voltage of the power supply circuit and the target value of the output voltage, and the switching duty ratio is controlled according to the output of the error amplifier, so as to stabilize the output voltage to the target value. With a digital control method, an A/D converter converts the output voltage of the power supply circuit into a digital value, and the duty ratio of a switching transistor is controlled by means of digital signal processing.

SUMMARY OF THE INVENTION

It is an exemplary purpose of such an embodiment to provide a control circuit for a switching power supply which is capable of suppressing characteristic degradation that can occur in a component such as a capacitor.

An embodiment of the present invention relates to a control circuit that forms a switching power supply together with an output circuit comprising an external circuit component. The control circuit comprises: a switching controller that controls a switching element of the switching power supply; and a degradation detection circuit that monitors a detection signal having a correlation with characteristic degradation of the circuit component so as to detect the degree of characteristic degradation of the circuit component. The switching controller changes its operation according to the degree of characteristic degradation of the circuit component.

With such an embodiment, the operation of the switching controller is changed according to characteristic degradation of the circuit component so as to suppress the progress of characteristic degradation of the circuit component. That is to say, such an arrangement is capable of suppressing further characteristic degradation of the circuit component, thereby improving the operating life of the circuit component. This increases the time before the circuit component must be replaced.

Also, the circuit component may be configured as a capacitor. Also, the characteristic degradation of the circuit component may be an increase in ESR (equivalent series resistance).

An increase in ESR involves an increase in heat generation. By changing the operation of the switching controller so as to suppress heat generation, such an arrangement is capable of increasing the operating life of the circuit component.

Also, the switching controller may raise the switching frequency according an increase in ESR of the capacitor.

By raising the switching frequency so as to suppress the ripple amplitude due to a change in voltage drop that occurs due to the ESR, such an arrangement is capable of suppressing heat generation.

Also, the circuit component may be configured as a smoothing capacitor connected to an output line of the switching power supply.

Also, the degradation detection circuit may monitor, as the detection signal, the ripple amplitude of an output voltage that develops at the output line.

By monitoring the ripple amplitude, such an arrangement is capable of detecting long-term variation of the ESR in the actual operation of the switching power supply.

Also, the circuit component may be configured as an aluminum electrolytic capacitor.

Also, the control circuit may further comprise an A/D converter that converts a feedback voltage that corresponds to the output voltage into a digital value. Also, the degradation detection circuit may detect characteristic degradation of the circuit component based on the output of the A/D converter.

Also, the degradation detection circuit may comprise a calculation unit that calculates an estimated degradation value to be used as an index of the degree of characteristic degradation of the circuit component based on the detection signal.

Also, the degradation detection circuit may further comprise a judgment unit that compares the estimated degradation value with a predetermined first threshold value, and that generates a first control signal which is asserted when the estimated degradation value crosses the first threshold value. Also, when the first control signal is asserted, the switching controller may raise the switching frequency.

Also, the judgment unit may compare the estimated degradation value with a predetermined second threshold value, and to generate a second control signal which is asserted when the estimated degradation value crosses the second threshold value.

Also, the control circuit may further comprise a communication unit that notifies an external circuit of the assertion of the second control signal.

With such an arrangement, an external processor controls a display apparatus. Thus, such an arrangement is capable of notifying the user or operator of the characteristic degradation of the circuit component.

Also, when the estimated degradation value discontinuously changes, the judgment unit may judge that a malfunction has occurred in the circuit component.

Also, the control circuit may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit as a single chip, such an arrangement allows the circuit area to be reduced, and allows the circuit elements to have uniform characteristics.

Also, the switching power supply may be configured as a DC/DC converter. Also, the switching controller may further comprise: an error detector that detects the difference between the output of the A/D converter and a predetermined target value; a compensator that generates a duty instruction value adjusted such that the difference approaches zero; a digital pulse modulator that generates a pulse signal having a duty ratio that corresponds to the duty instruction value; and a driver that drives the switching element according to the pulse signal.

Another embodiment of the present invention relates to a digital control power supply circuit. The digital control power supply circuit may comprise: an output circuit comprising at least a switching element, an inductor, and an output line at which a DC output voltage develops according to the switching operation of the switching element; and any one of the aforementioned control circuits that control the switching element based on the output voltage.

Yet another embodiment of the present invention relates to an electronic device. The electronic device comprises the aforementioned digital control power supply circuit.

Yet another embodiment of the present invention relates to a mobile communication base station. The mobile communication base station comprises the aforementioned digital control power supply circuit.

Also, the switching power supply may be configured as a charge pump circuit.

Yet another embodiment of the present invention relates to a semiconductor integrated circuit. The semiconductor integrated circuit is used together with an external circuit component. The semiconductor integrated circuit may comprise a degradation detection circuit that monitors a signal having a correlation with characteristic degradation of the circuit component, and that detects the degree of characteristic degradation of the circuit component. The semiconductor integrated circuit changes its operation according to the degree of characteristic degradation of the circuit component.

With such an embodiment, the operation of the switching controller is changed according to characteristic degradation of the circuit component so as to suppress the progress of characteristic degradation of the circuit component. This allows the operating life of the circuit component to be increased, thereby increasing the time before the circuit component must be replaced.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B. Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
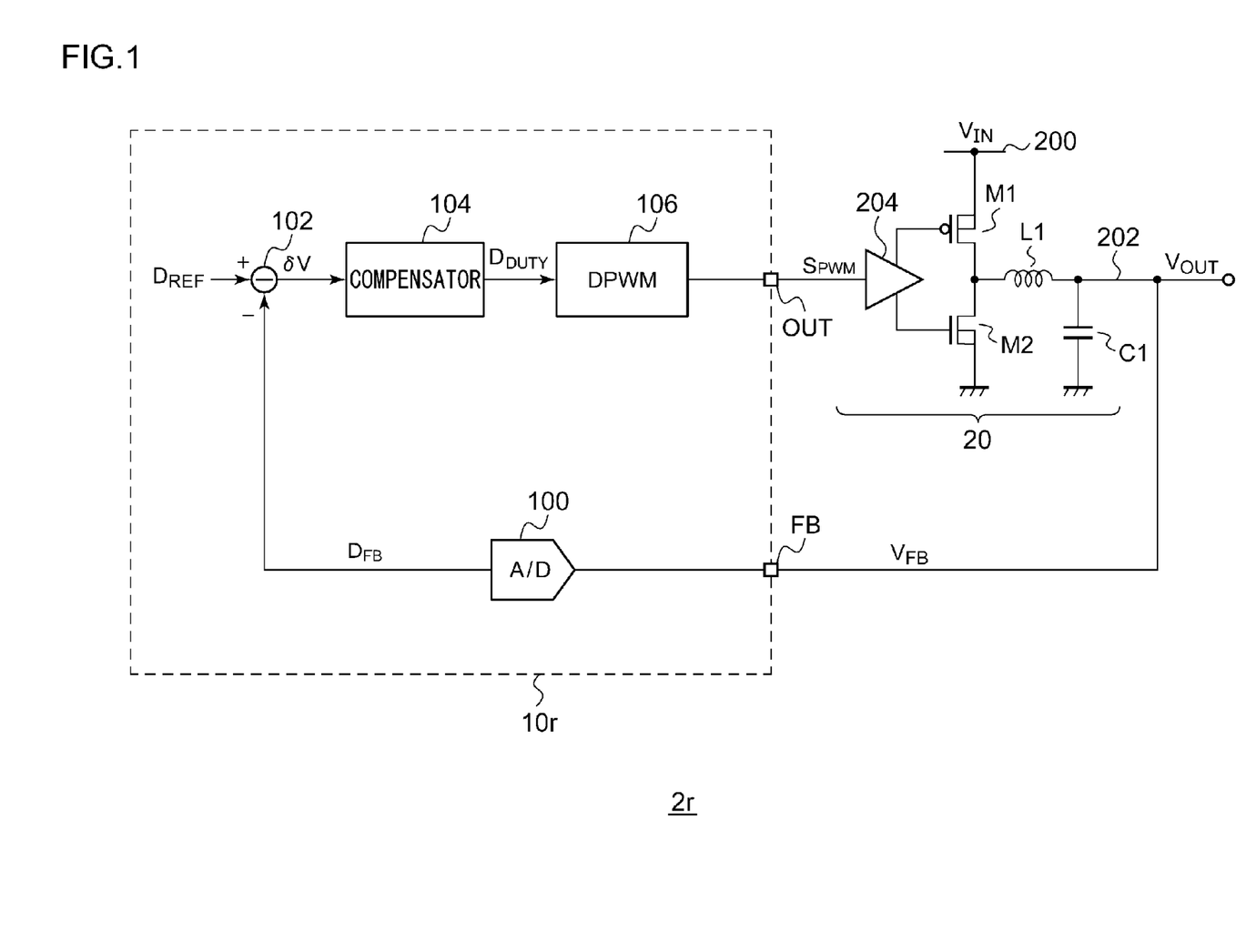
FIG. 1 is a block diagram showing a configuration of a digital control power supply circuit investigated by the present inventor.

FIG. 1 is a block diagram showing a configuration of a digital control power supply circuit (which will be referred to simply as the "power supply circuit") investigated by the present inventor.

A power supply circuit $2r$ includes a control circuit $10r$ and an output circuit 20. The power supply circuit $2r$ receives an input voltage $V_{IN}$ via an input line 200, steps down the input voltage $V_{IN}$, and supplies an output voltage $V_{OUT}$ thus stepped down to a load (not shown) connected to an output line 202.

An output circuit 20 includes a driver 204, a switching transistor M1, a synchronous rectification transistor M2, an inductor L1, and an output smoothing capacitor C1. FIG. 1 shows an output circuit of a step down DC/DC converter. The driver 204 switches on and off the switching transistor M1 and the synchronous rectification transistor M2 according to a pulse signal $S_{PWM}$ output from an output terminal OUT of the control circuit $10r$.

A feedback terminal FB of the control circuit $10r$ receives, as an input signal, a feedback voltage $V_{FB}$ that corresponds to the output voltage $V_{OUT}$. The control circuit $10r$ includes an A/D converter 100, an error detector 102, a compensator 104, and a digital pulse modulator 106. The A/D converter 100 converts the feedback voltage $V_{FB}$ into digital feedback data $D_{FB}$. The error detector 102 calculates error data $\delta V$ that represents the difference between the feedback data $D_{FB}$ and its target value $D_{REF}$. The compensator 104 generates a duty instruction value $D_{DUTY}$ for adjusting the error data $\delta V$ such that it approaches zero. The digital pulse modulator 106 receives the duty instruction value $D_{DUTY}$, and generates the pulse signal $S_{PWM}$ having a duty ratio that corresponds to the duty instruction value $D_{DUTY}$. The digital pulse modulator 106 may be configured as a pulse width modulator, for example.

The present inventor has investigated such a power supply circuit $2r$, and has come to recognize the following problems.

In such a power supply circuit $2r$, in many cases, the inductor L1 or the output smoothing capacitor C1 is configured as a surface-mounted or lead-type component. For example, as such an output smoothing capacitor C1, an aluminum electrolytic capacitor is employed. However, such an aluminum electrolytic capacitor has a problem in that the ESR (equivalent series resistance) increases with long-term use over a number of years.

A coil current $I_L(t)$ flows through the inductor L1, and repeatedly and alternately increases and decreases at a constant slope according to the switching of the switching transistor M1 and the synchronous rectification transistor M2. The coil current $I_L$ flows into the output smoothing capacitor C1. This leads to superimposition of a ripple component $V_{RIP}$, which occurs due to the ESR, on the output voltage $V_{OUT}$ of the power supply circuit 2r. With the duty ratio of the switching transistor M1 as D, the ripple is represented by the following Expression (1). If the ESR increases due to aging degradation, this leads to an increase in the amplitude of the ripple component $V_{RIP}$.

$$V_{RIP}=ESR \times V_{OUT}(1-D)/(L \times f_{SW}) \quad (1)$$

The watt loss that occurs in the capacitor due to the ripple current $I_{RIP}$ is represented by the following Expression (2).

$$W_{RIP}=I_{RIP}^2 \times ESR$$

That is to say, as the ESR increases, the watt loss becomes large, leading to an increase in heat generation. Here, characteristic degradation of the capacitor, i.e., an increase in ESR, is promoted at high temperatures. Accordingly, once the ESR increases due to such characteristic degradation, this leads to a further increase in ESR, resulting in a spiral of characteristic degradation.

Description has been made regarding an electrolytic capacitor as an example. Also, similar problems of such characteristic degradation can occur in an inductor employed in a switching power supply and a power transistor employed in a switching transistor.

Figure 2:
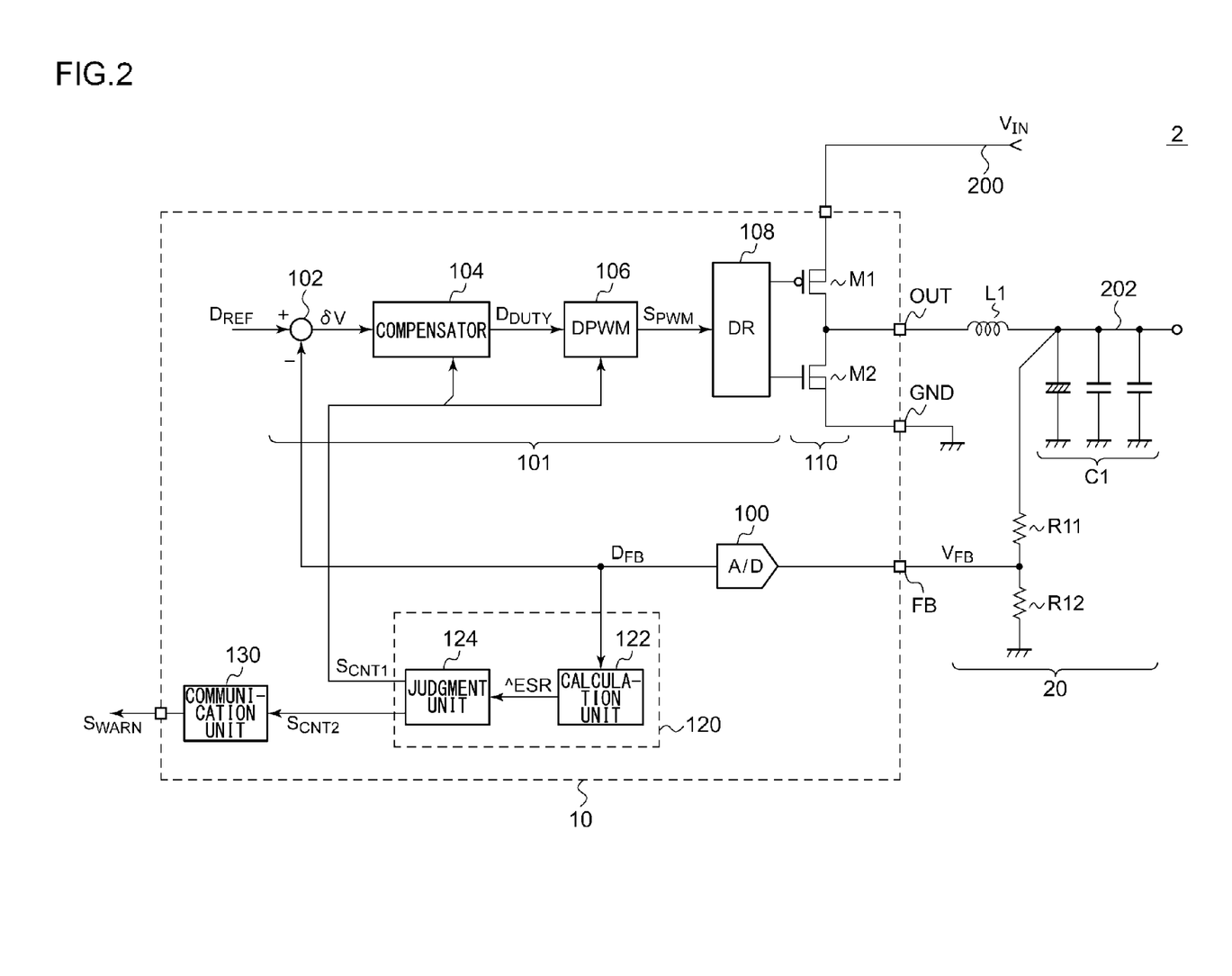
FIG. 2 is a circuit diagram showing a switching power supply circuit according to an embodiment.

FIG. 2 is a circuit diagram showing a switching power supply circuit (which will be referred to as a "power supply circuit" hereafter) 2 according to an embodiment. The power supply circuit 2 includes a control circuit 10 and an output circuit 20. The output circuit 20 includes multiple circuit components each configured as an external component of the control circuit 10. The power supply circuit 2 shown in FIG. 2 is configured as a step-down DC/DC converter. The output circuit 20 includes an output line 202, an inductor L1, an output smoothing capacitor C1, and resistors R11 and R12. The output circuit 20 has a circuit topology of a typical step-down DC/DC converter. Accordingly, description thereof will be omitted.

The control circuit 10 is configured as a function IC (Integrated circuit) monolithically integrated on a single semiconductor substrate. The control circuit 10 includes an A/D converter 100, a switching controller 101, a switching circuit 110, a degradation detection circuit 120, and a communication unit 130.

An input (IN) terminal of the control circuit 10 is connected to the input line 200. The input DC voltage $V_{IN}$ of the DC/DC converter is input to the input terminal (IN). A ground (GND) terminal of the control circuit 10 is grounded. An output (OUT) terminal of the control circuit 10 is connected to one end of the inductor L1.

The switching controller 101 includes a switching transistor M1 and a synchronous rectification transistor M2 each configured as a switching element of a synchronous rectification DC/DC converter. The switching transistor M1 is arranged between the IN terminal and the OUT terminal. The synchronous rectification transistor M2 is arranged between the OUT terminal and the GND terminal.

A feedback (FB) terminal of the control circuit 10 receives, as an input signal, the feedback voltage $V_{FB}$ obtained by dividing, by means of the resistors R11 and R12, the output voltage $V_{OUT}$ that develops at the output line 202.

The power supply circuit 2 according to the embodiment is configured as a digital control power supply. The control circuit 10 is mainly configured as a digital circuit. The A/D converter 100 converts the feedback voltage $V_{FB}$ into a digital value $D_{FB}$.

The switching controller 101 controls the switching elements M1 and M2 of the power supply circuit 2. Specifically, the switching controller 101 generates a pulse signal $S_{PWM}$ having a duty ratio such that the feedback voltage $V_{FB}$ approaches the target voltage $V_{REF}$. The switching transistor M1 and the synchronous rectification transistor M2 of the switching circuit 110 are switched on and off in a complementary manner according to the pulse signal $S_{PWM}$.

The configuration of the switching controller 101 is not restricted in particular. For example, the switching controller 101 includes an error detector 102, a compensator 104, a digital pulse modulator 106, and a driver 108.

The error detector 102 calculates error data $\delta V$ that represents a difference (deviation) between the feedback value $D_{FB}$ and the target value $D_{REF}$ of the feedback value $D_{FB}$. The compensator 104 performs a PID control operation or the like so as to generate a duty instruction value $D_{DUTY}$ having a value adjusted such that the error data $\delta V$ approaches zero. The digital pulse modulator 106 receives the duty instruction value $D_{DUTY}$, and generates the pulse signal $S_{PWM}$ having a duty ratio that corresponds to the duty instruction value $D_{DUTY}$ thus received. The digital pulse modulator 106 may be configured as a pulse width modulator, for example.

The driver 108 switches on and off the switching transistor M1 and the synchronous rectification transistor M2 in a complementary manner according to the pulse signal $S_{PWM}$.

The degradation detection circuit 120 monitors a detection signal having a correlation with the characteristic degradation that occurs in a circuit component, and detects the degree of characteristic degradation that occurs in the circuit component. The switching controller 101 is configured to be capable of changing its operation according to the degree of characteristic degradation of the circuit component. In the present embodiment, the output smoothing capacitor C1 is a circuit component which is to be monitored for such characteristic degradation. The characteristic degradation that can occur in the output smoothing capacitor C1 is ESR. Typically, the output smoothing capacitor C1 includes multiple capacitors connected in parallel. At least one of the multiple capacitors is configured as an aluminum electrolytic capacitor.

Such an aluminum electrolytic capacitor has a problem in that the ESR increases with long-term use. An increase in the ESR leads to an increase in ripples that occurs in the output voltage $V_{OUT}$ of the power supply circuit 2. Thus, the degradation detection circuit 120 monitors the feedback voltage $V_{FB}$ that corresponds to the output voltage $V_{OUT}$ as a detection signal having a correlation with the characteristic degradation of the aluminum electrolytic capacitor.

The degradation detection circuit 120 detects the degree of characteristic degradation of the aluminum electrolytic capacitor based on the digital feedback value $D_{FB}$ output from the A/D converter 100.

The degradation detection circuit 120 includes a calculation unit 122 and a judgment unit 124. The calculation unit 122 calculates the ripple value (amplitude) of the output voltage $V_{OUT}$ based on the digital feedback value $D_{FB}$, and generates an estimated degradation value ^ESR having a correlation with the ESR. When the inductance L of the inductor L1 and the duty ratio of the pulse signal $S_{PWM}$ are each a known value, the calculation unit 122 is capable of calculating the estimated degradation value ^ESR based on the inductance L, the duty ratio, and the feedback value $D_{FB}$. It should be noted that the estimated degradation value ^ESR may be configured as an estimated value of the ESR itself, which is a characteristic value of the output smoothing capacitor C1. Also, other values having a known relation with the ESR may be employed as the estimated degradation value ^ESR, examples of which include a ripple amplitude. That is to say, the estimated degradation value ^ESR may preferably be configured as an index that represents the degree of the characteristic degradation of the circuit component.

The switching controller 101 raises a switching frequency (which is also referred to as the "carrier frequency") $f_{SW}$ of the switching circuit 110 according to an increase in the ESR of the output smoothing capacitor C1. Specifically, when the degradation detection circuit 120 detects an increase in the ESR, the switching controller 101 raises the frequency of a PWM carrier (cyclic signal) to be used in the digital pulse modulator 106.

The judgment unit 124 controls the switching controller 101 according to the estimated degradation value ^ESR calculated by the calculation unit 122. For example, the judgment unit 124 compares the estimated degradation value ^ESR with at least one threshold value TH determined beforehand.

In the present embodiment, multiple threshold values TH are determined for the judgment unit 124.

A first threshold value TH1 is used to switch the switching frequency $f_{SW}$ of the switching circuit 110. The degradation detection circuit 120 compares the estimated degradation value ^ESR with the first threshold value TH1 determined beforehand. When the estimated degradation value ^ESR crosses the first threshold value TH1, the degradation detection circuit 120 asserts a first control signal $S_{CNT1}$.

When the first control signal $S_{CNT1}$ is asserted, the switching controller 101 raises the switching frequency $f_{SW}$. When the estimated degradation value ^ESR is smaller than the first threshold value TH1, the switching controller 101 sets the switching frequency $f_{SW}$ to a first value $f_{SW1}$. Subsequently, when the estimated degradation value ^ESR becomes larger than the first threshold value TH1, the switching controller 101 sets the switching frequency $f_{SW}$ to a second value $f_{SW2}$ that is greater than the first value $f_{SW1}$.

The parameters to be used in the compensator 104, such as a proportional gain, an integration gain, a filter constant, and so forth, are optimized in order to provide a required target frequency response according to (i) the pole frequency, (ii) the zero frequency, (iii) the gain, and (iv) the switching frequency $f_{SW}$. Accordingly, in some cases, each optimized parameter value for the compensator 104 changes according to a change in the switching frequency $f_{SW}$. Thus, when the digital pulse modulator 106 is instructed to change the switching frequency $f_{SW}$, i.e., when the first control signal $S_{CNT1}$ is asserted, the parameters for the compensator 104 may each be switched to a value that corresponds to the second value $f_{SW2}$ thus changed, in response to the assertion of the first control signal $S_{CNT1}$. In this stage, the parameters for the compensator 104 may each be gradually changed over a given transition period.

On the other hand, a second threshold value TH2 is configured as a threshold value for notifying a processor external to the control circuit 10 of the characteristic degradation of the output smoothing capacitor C1.

The degradation detection circuit 120 compares the estimated degradation value ^ESR with the second threshold value TH2. When the estimated degradation value ^ESR crosses the second threshold value TH2, the degradation detection circuit 120 asserts a second control signal $S_{CNT2}$. When the second control signal $S_{CNT2}$ is asserted, the communication unit 130 asserts (sets to high level, for example) a warning signal $S_{WARN}$ for notifying an external processor of degradation of the circuit component.

Figure 3:
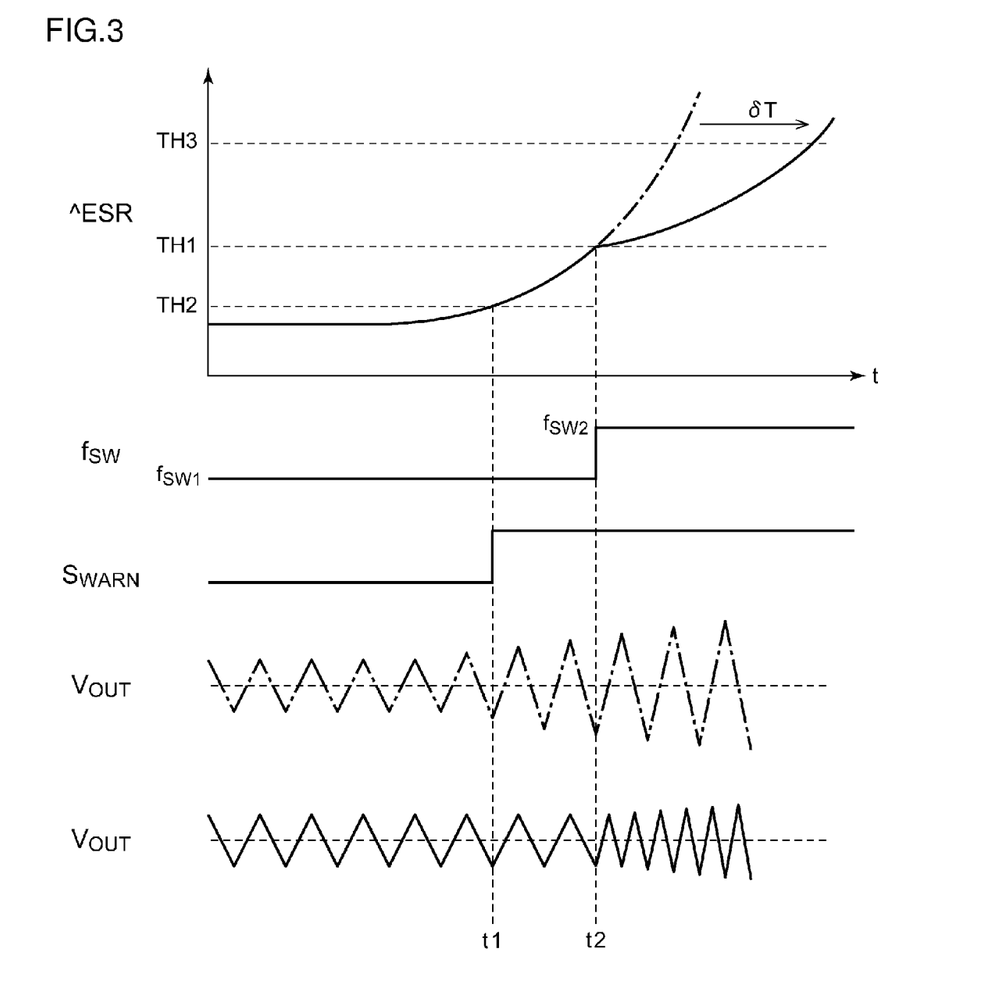
FIG. 3 is a diagram showing the operation of the power supply circuit shown in FIG. 2.

The above is the configuration of the power supply circuit 2. Next, description will be made regarding the operation thereof. FIG. 3 is a diagram showing the operation of the power supply circuit 2 shown in FIG. 2.

Here, description will be made regarding a case in which TH2<TH1. The line of alternately long and short dashes represents the operation of a conventional power supply circuit 2r. In order to clarify the advantage of the power supply circuit 2 shown in FIG. 2, first, description will be made regarding the operation of the conventional power supply circuit 2r with reference to the operation represented by the line of alternately long and short dashes.

The estimated degradation value ^ESR increases with long-term use. When the estimated degradation value ^ESR crosses the second threshold value TH2 at a time point t1, the warning signal $S_{WARN}$ is asserted. A threshold value TH3 shown in the drawing represents a value at which the switching power supply cannot operate normally. Thus, there is a need to replace the output smoothing capacitor C1 with a new one before ^ESR reaches TH3.

An increase in ESR leads to an increase in the ripple amplitude of the output voltage $V_{OUT}$, resulting in increased watt loss. This leads to increased heat generation. Moreover, characteristic degradation of the capacitor, i.e., an increase in ESR, accelerates in a high-temperature state. Accordingly, with such a conventional power supply circuit 2r, once the ESR increases due to such characteristic degradation, this leads to a further increase in ESR, resulting in spiral of characteristic degradation.

Next, description will be made regarding the operation of the power supply circuit 2 shown in FIG. 2. With the power supply circuit 2 shown in FIG. 2, when the estimated degradation value ^ESR crosses the first threshold value TH1 at a time point t2, the switching frequency $f_{SW}$ of the power supply circuit 2 is raised. An increase in the switching frequency $f_{SW}$ reduces the ripple amplitude of the output voltage $V_{OUT}$. This reduces heat generation that occurs in the output smoothing capacitor C1, thereby suppressing progression of the characteristic degradation. As a result, such an arrangement is capable of increasing, by δT, the time before the estimated degradation value ^ESR reaches the threshold value TH3, i.e., the operating life of the output smoothing capacitor C1. Such an arrangement is capable of increasing the time before the output smoothing capacitor C1 must be replaced.

The above is the operation of the power supply circuit 2. With the power supply circuit 2, such an arrangement provides the following advantages.

With the power supply circuit 2, the operation of the switching controller 101 is changed according to characteristic degradation of a circuit component so as to suppress the characteristic degradation of the circuit component. This suppresses further characteristic degradation, thereby increasing the operating life of the circuit component. Thus, such an arrangement is capable of increasing the time before the circuit component must be replaced.

In particular, directing attention to an increase in ESR, which represents the degree of characteristic degradation of an electrolytic capacitor employed as the output smoothing capacitor C1, such an arrangement is capable of raising the switching frequency $f_{SW}$. Thus, such an arrangement is capable of suppressing an increase in watt loss of the capacitor regardless of an increase in ESR, thereby appropriately suppressing the characteristic degradation.

Furthermore, in order to detect an increase in ESR, such an arrangement is configured to monitor the ripple voltage that occurs in the output voltage $V_{OUT}$ of the power supply circuit 2. This allows the degree of characteristic degradation of the capacitor to be monitored in the actual operation of the power supply circuit 2. In other words, the switching power supply is capable of providing a self-diagnostic mode without a need to suspend its operation, which is an advantage.

[Usage]

Figure 4A:
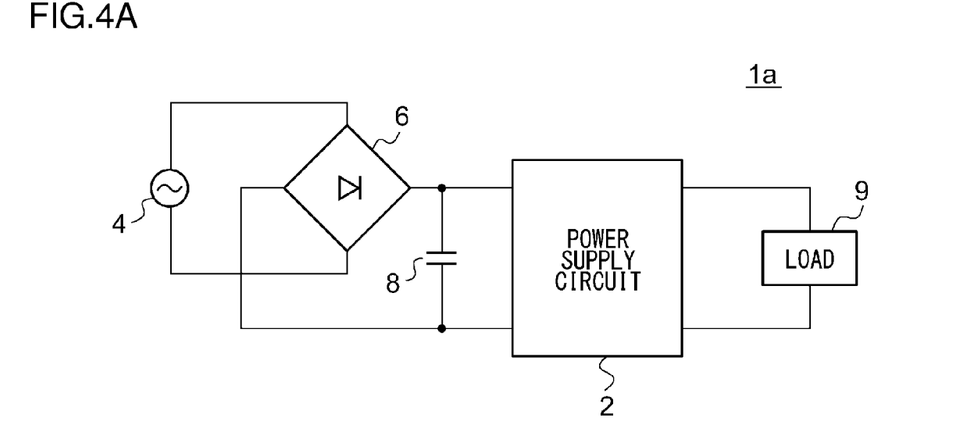
FIGS. 4A and 4B are block diagrams each showing an electronic device including a power supply circuit.
Figure 4B:
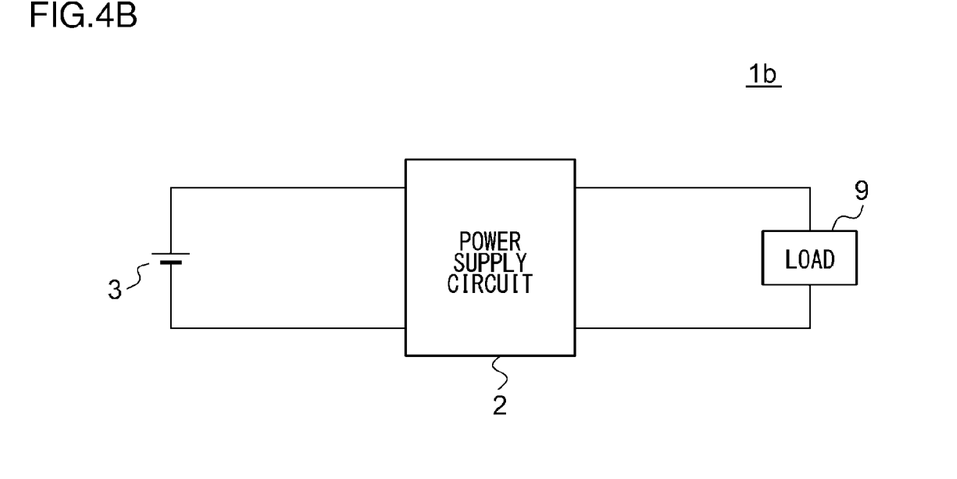

Lastly, description will be made regarding the usage of the power supply circuit 2. FIGS. 4A and 4B are block diagrams each showing an electronic device including the power supply circuit 2. An electronic device 1a shown in FIG. 4A includes a bridge circuit 6 that rectifies AC voltage received from a commercial AC power supply 4, a smoothing capacitor 8, the aforementioned power supply circuit 2, and a load 9. In this case, as such a power supply circuit 2, a non-insulated step-down, step-up, or otherwise step-up/step-down converter may be preferably employed. Examples of such an electronic device 1a include mobile communication base stations, consumer electronics devices such as TVs, refrigerators, etc., OA devices such as faxes, copiers, etc., machine tools, and the like.

In particular, in many cases, mobile communication base stations are each located at a distant place where frequent access is difficult. The advantage of increasing the operating life of the output smoothing capacitor C1 is particularly effective in this usage.

An electronic device 1b shown in FIG. 4B includes a battery 3, the aforementioned power supply circuit 2 that receives the voltage of the battery, and a load 9. Examples of such an electronic device 1b include cellular phone terminals, tablet PCs, digital still cameras, digital video cameras, and the like. For example, the load 9 may be configured as a microcomputer, memory, a liquid crystal driver, a liquid crystal backlight LED, a camera flash LED, or the like.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

Multiple first threshold values TH1 may be determined. In this case, such an arrangement is capable of switching the switching frequency $f_{SW}$ in multiple steps. In the same way, multiple second threshold values TH2 may be determined. In this case, such an arrangement is capable of notifying an external processor of the degree of characteristic degradation at a finer resolution. Also, the communication unit 130 may be configured to transmit the estimated degradation value ^ESR itself to an external circuit.

Second Modification

Typically, the estimated degradation value ^ESR continuously changes with long-term use. Accordingly, when the estimated degradation value ^ESR discontinuously changes, a possible cause is a malfunction due to disconnection, short-circuit, or the like. Thus, when the estimated degradation value ^ESR discontinuously changes, the judgment unit 124 may judge that a malfunction has occurred in the circuit component. This allows the malfunction in the circuit component to be detected in a sure manner.

Description has been made in the embodiment regarding an arrangement in which the calculation unit 122 measures the characteristic degradation of the output smoothing capacitor C1 in the actual operation at all times. However, the present invention is not restricted to such an arrangement. For example, the calculation unit 122 may measure the characteristic degradation at predetermined intervals. Specifically, the calculation unit 122 may measure the characteristic degradation once every several hours, once every day, or otherwise once every several days.

Third Modification

Also, in a case in which the situation allows it, the control circuit 10 may be configured to be capable of changing its operation mode between an actual operation mode and a self-diagnostic mode. With such an arrangement, the control circuit 10 may be configured to measure the characteristic degradation of the output smoothing capacitor C1 in the self-diagnostic mode.

Fourth Modification

The degradation measurement method used in the degradation detection circuit 120 is not restricted to the ripple measurement for measuring the ripple of the output voltage $V_{OUT}$. For example, the degradation detection circuit 120 may output, to the output circuit 20, a test signal including a predetermined frequency component, and measure the frequency response so as to measure the ESR of the output smoothing capacitor C1. Examples of such a test signal include white noise signals, impulse waveform signals, step-up waveform signals, and the like.

Fifth Modification

Description has been made in the embodiment regarding an example in which the circuit component is a capacitor, and particularly, an electrolytic capacitor. However, the kind of circuit component is not restricted to such an arrangement. For example, the degradation detection circuit 120 may detect the characteristic degradation of an inductor, a power transistor, a diode, or the like.

Description has been made in the embodiment regarding an arrangement in which the switching frequency is raised in order to suppress the progress of the characteristic degradation. However, the present invention is not restricted to such an arrangement. By controlling the current that flows through the circuit component instead of or in addition to controlling the switching frequency, such an arrangement may be configured to suppress the progress of characteristic degradation. For example, in the switching power supply, the upper limit value of the coil current may be reduced so as to control the current.

Sixth Modification

Description has been made in the embodiment regarding a digital control power supply for exemplary purposes. However, the present invention is not restricted to such an arrangement. Also, the present invention is applicable to an analog control power supply circuit. Also, the pulse modulation method is not restricted in particular. For example, the present invention is applicable to various kinds of pulse modulation such as a fixed on time method, fixed off time method, pulse frequency modulation method, etc.

Seventh Modification

Description has been made in the embodiment regarding the power supply circuit 2 configured as a step-down converter. However, the present invention is not restricted to such an arrangement. Also, the power supply circuit 2 may be configured as a step-up converter or a step-up/step-down converter. Also, the power supply circuit 2 may be configured as a forward converter or a flyback converter each employing a transformer. The circuit topology of the output circuit 20 may preferably be modified according to the configuration of the power supply circuit.

Figure 5:
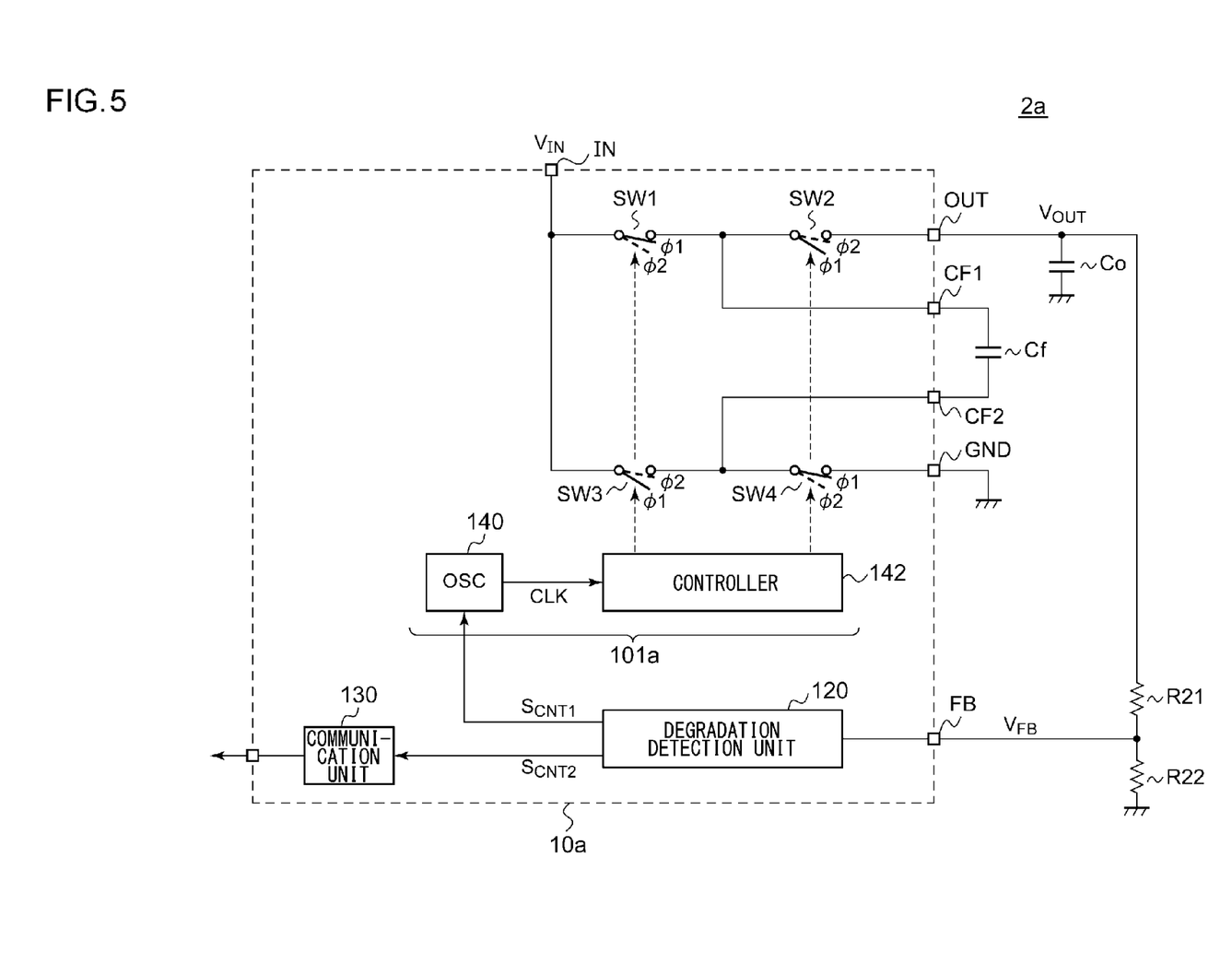
FIG. 5 is a circuit diagram showing a power supply circuit according to a modification.

Also, the present invention is applicable to a charge pump circuit. FIG. 5 is a circuit diagram showing a power supply circuit 2a according to a modification. The charge pump circuit shown in FIG. 5 is configured as a step-up circuit having a gain of 2. An OUT terminal of a control circuit 10a is connected to an output capacitor Co. Furthermore, a CF terminal is connected to a flying capacitor Cf. A GND terminal is grounded. An FB terminal receives, as an input signal, a feedback voltage $V_{FB}$ obtained by dividing an output voltage $V_{OUT}$ by means of resistors R21 and R22.

A switching controller 101a includes multiple switches SW1 through SW4, an oscillator 140, and a controller 142. The controller 142 controls the switches SW1 through SW4 in synchronization with a clock CLK generated by the oscillator 140. Specifically, the switching controller 101a alternately and repeatedly switches its state between a state φ1 in which a pair of switches SW1 and SW4 are turned on so as to charge the flying capacitor Cf and a state φ2 in which a pair of switches SW2 and SW3 are turned on so as to transfer the charge stored in the flying capacitor Cf to the output capacitor Co.

For example, the degradation detection circuit 120 detects the characteristic degradation of the output capacitor Co (increase in ESR) based on the feedback voltage $V_{FB}$. When the estimated degradation value exceeds a first threshold value, the oscillation frequency of the oscillator 140 may be raised. This reduces the amount of charge transferred for each cycle. Thus, such an arrangement is capable of controlling the amount of current that flows into the output capacitor Co, thereby suppressing the progress of characteristic degradation.

Eighth Modification

Description has been made in the embodiment regarding degradation of a circuit component of a switching power supply. However, the present invention is not restricted to such an arrangement. Rather, the present invention is broadly applicable to various kinds of circuits. That is to say, the invention as derived from the following technical idea is also encompassed within the technical scope of the present invention.

A semiconductor integrated circuit is provided, which is used together with an external circuit component. The semiconductor integrated circuit includes a degradation detection circuit that monitors a signal having a correlation with the characteristic degradation of the circuit component so as to detect the degree of characteristic degradation of the circuit component. The semiconductor integrated circuit is configured to be capable of changing its operation according to the degree of characteristic degradation of the circuit component.

While the preferred embodiments of the present invention have been described using specific terms, such description is for illustrative purposes only, and it is to be understood that changes and variations may be made without departing from the spirit or scope of the appended claims.

What is claimed is:

1. A control circuit structured to form a switching power supply together with an output circuit comprising an external circuit component, the control circuit comprising:
   a switching controller structured to control a switching element of the switching power supply; and
   a degradation detection circuit structured to monitor a detection signal having a correlation with characteristic degradation of the external circuit component so as to detect a degree of characteristic degradation of the external circuit component;
   wherein the switching controller is structured to change its operation according to the degree of characteristic degradation of the external circuit component;
   wherein the degradation detection circuit comprises a calculation unit structured to calculate an estimated degradation value to be used as an index of the degree of characteristic degradation of the external circuit component based on the detection signal;
   wherein the degradation detection circuit further comprises a judgment unit structure to compare the estimated degradation value with a predetermined first threshold value, and to generate a first control signal which is asserted when the estimated degradation value crosses the first threshold value; and
   wherein, the switching controller is structured to raise a switching frequency of the switching power supply when the first control signal is asserted.

2. The control circuit according to claim 1, wherein the external circuit component is configured as a capacitor, and wherein the characteristic degradation of the external circuit component is an increase in equivalent series resistance (ESR).

3. The control circuit according to claim 2, wherein the switching controller is structured to raise the switching frequency according to the increase in ESR of the capacitor.

4. The control circuit according to claim 2, wherein the capacitor configured as the external circuit component is further configured as a smoothing capacitor connected to an output line of the switching power supply.

5. The control circuit according to claim 4, wherein the degradation detection circuit monitors, as the detection signal, a ripple amplitude of an output voltage that develops at the output line.

6. The control circuit according to claim 4, further comprising an A/D converter structured to convert a feedback voltage that corresponds to an output voltage of the switching power supply into a digital value; and wherein the degradation detection circuit is structured to detect the characteristic degradation of the external circuit component based on an output of the A/D converter.

7. The control circuit according to claim 6, wherein the switching power supply is configured as a DC/DC converter, wherein the switching controller further comprises:
   an error detector structured to detect a difference between the output of the A/D converter and a predetermined target value;
   a compensator structured to generate a duty instruction value adjusted such that the difference approaches zero;
   a digital pulse modulator structured to generate a pulse signal having a duty ratio that corresponds to the duty instruction value; and
   a driver structured to drive the switching element according to the pulse signal.

8. The control circuit according to claim 2, wherein the capacitor configured as the external circuit component is further configured as an aluminum electrolytic capacitor.

9. The control circuit according to claim 1, wherein the judgment unit is structured to compare the estimated degradation value with a predetermined second threshold value, and to generate a second control signal which is asserted when the estimated degradation value crosses the second threshold value; and
   wherein the control circuit further comprises a communication unit structured to notify a second external circuit of the assertion of the second control signal.

10. The control circuit according to claim 1, wherein the judgment unit is structured to judge that a malfunction has occurred in the external circuit component when the estimated degradation value discontinuously changes.

11. The control circuit according to claim 1, monolithically integrated on a single semiconductor substrate.

12. The control circuit according to claim 1, wherein the switching power supply is configured as a charge pump circuit.

13. A power supply circuit comprising:
   an output circuit that comprises at least a switching element, an inductor, and an output line at which a DC output voltage develops according to a switching operation of the switching element; and
   a control circuit structured to control the switching element based on the DC output voltage,
   wherein the control circuit comprises:
      a switching controller structured to control the switching element of the switching power supply; and
      a degradation detection circuit structured to monitor a detection signal having a correlation with characteristic degradation of an external circuit component so as to detect a degree of characteristic degradation of the external circuit component;
   wherein the switching controller is structured to change its operation according to the degree of characteristic degradation of the external circuit component,
   wherein the degradation detection circuit comprises a calculation unit structured to calculate an estimated degradation value to be used as an index of the degree of characteristic degradation of the external circuit component based on the detection signal;
   wherein the degradation detection circuit further comprises a judgment unit structure to compare the estimated degradation value with a predetermined first threshold value, and to generate a first control signal which is asserted when the estimated degradation value crosses the first threshold value; and
   wherein, the switching controller is structured to raise a switching frequency of the switching power supply when the first control signal is asserted.

14. An electronic device comprising the power supply circuit according to claim 13.

15. A mobile communication base station comprising the power supply circuit according to claim 13.

* * * * *